Dec. 8, 1936.  W. J. MacLEOD  2,063,611
WELT
Filed Oct. 11, 1935
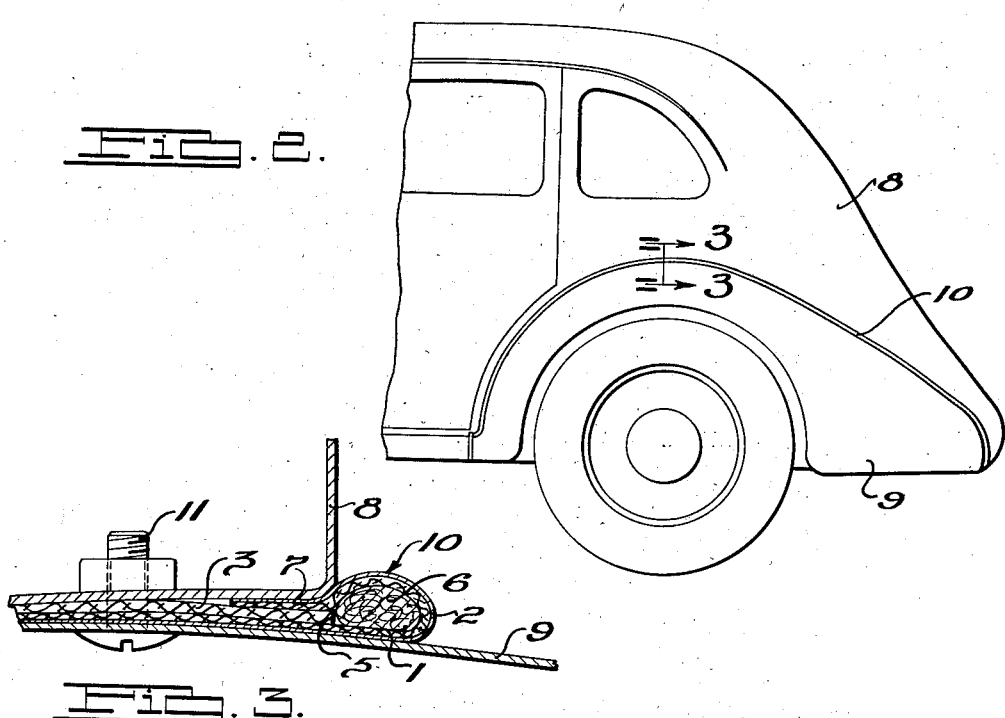
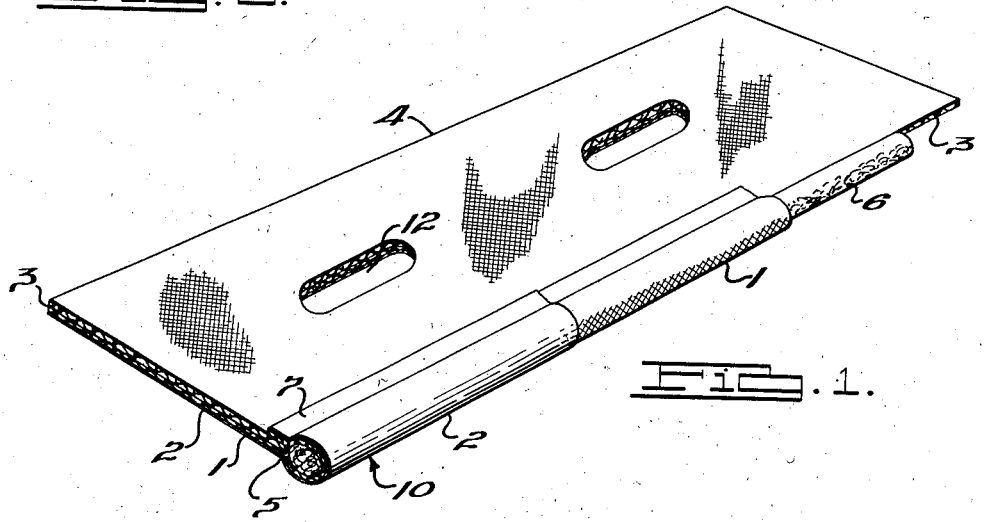
INVENTOR.
William J. MacLeod.
BY
Harness, Dickey, Pierce & Hann,
ATTORNEYS.

Patented Dec. 8, 1936                                                                          2,063,611

UNITED STATES PATENT OFFICE 2,063,611

WELT

William J. MacLeod, Detroit, Mich., assignor to Backstay Welt Co., a corporation of Indiana Application October 11, 1935, Serial No. 44,562

1 Claim. (Cl. 280—152)

My invention relates to a welt or packing strip of the type used in assembling automobile bodies to prevent leaks, squeaks or rattles between closely adjacent body portions.

It is the object of my invention to provide a welt strip of the class described which is inexpensive to manufacture, easy to assemble, and which effectively seals the joint between adjacent body members against the passage of water and prevents squeaks and rattles due to relative movement between said members.

Another object is to provide a sound deadening welt of the type described.

Other objects and advantages of the invention will become apparent from the following specification, the drawing relating thereto and the claim as hereinafter set forth.

For a better understanding of the invention, reference may be had to the drawing, wherein:

Figure 1 is a perspective view, partly broken away, of my improved welt strip;

Figure 2 is a partial elevation of an automobile body showing one point at which my improved welt strip may be used;

Figure 3 is a cross section, taken on the line 3—3 of Figure 2, showing the welt strip in assembled relation between the fender of an automobile and the main body portion.

As shown in Figure 1, my improved welt strip comprises a layer of fabric 1 coated on one side with a smooth, non-tacky water-proof material 2, such as a drying oil or a linseed oil paint. This coated fabric may be an ordinary oil cloth. A second layer 3 comprises a relatively coarse fabric, such as burlap, impregnated with a compound which will give the fabric body and sound deadening characteristics, and which is adhesive or tacky in its nature. A suitable compound for this purpose may be secured by mixing rubber latex with an asphalt compound, glue sizing, such as compounds of casein, and a clay. This second layer is secured to the uncoated side of layer 1 by the adhesive effect of the impregnating compound. The impregnated fabric is of less width than the fabric strip 1 with the result that while one edge thereof 4 terminates at the corresponding edge of strip 1 the other is spaced inwardly from but parallel with the opposite edge of strip 1, as shown at 5 in Figure 1.

A filler cord 6 of twisted paper or the like is rolled within the free edge of strip 1 and the marginal portion of this strip is secured in place by pressing it firmly upon the impregnated strip 3, as shown at 7, the impregnating compound effecting an adhesion between these parts. This forms a bead indicated generally at 10 at one edge of my welt strip.

In Figures 2 and 3, I have shown a portion of an ordinary sedan body having a rear body portion or panel 8 and a fender 9 secured thereto by bolts 11. As indicated in Figures 2 and 3, my welt strip is positioned between the overlapping flanges or marginal portions of the fender 9 and the body panel 8 with the bead 10 of the strip exposed at the outside of the joint. The body bolts 11 compress the leg portion of the strip between the portions of the body which are secured together. Suitable openings, as at 12, may be provided along the length of the strip to receive the body bolts 11.

The water-proof, non-tacky finish on fabric layer 1 is exposed at the outside of the bead and may be colored to correspond with the color of the automobile body. The provision of a smooth, non-tacky finish strip coextensive with one side of my welt strip is of advantage in that it provides a surface which is suitable for handling purposes.

The impregnation of the burlap backing strip with the above described compound not only imparts a highly satisfactory degree of body and stiffness to the strip, but at the same time supplies a tacky surface. It will be noted that the use of a backing strip having tacky surfaces greatly facilitates assembly of the strip since it eliminates the necessity of any additional means for securing the finish strip, cord and backing strip together. To assemble my improved welt strip it is only necessary to apply the tacky backing strip to one side of the finish strip, lay the cord along one edge and roll the free edge of the finish strip around said cord into contact with the opposite side of the backing strip, whereupon the whole may be pressed together into finally assembled form.

The completed welt strip is easily handled because of its one non-tacky surface, and yet when being assembled in an automobile the tacky surface may be relied upon to adhere to the car and hold the strip temporarily in position, thus facilitating assembly. In addition, I have found that the combination of a finish strip and a backing strip of the class described herein results in an exceedingly effective sound-deadening material for use between parts of an automobile body.

Although only one form of the invention has been illustrated and described in detail, it will be apparent to those skilled in the art that various modifications may be made without departing from the scope of the appended claim.

I claim:

An antisqueak strip for use between metal parts comprising a layer of coarse fabric of substantial thickness impregnated with a permanently resilient tacky material, a cord positioned along one edge of the fabric out of contact with the faces of the fabric, and a layer of oilcloth adhesively secured to said fabric by said tacky material, said oilcloth being coextensive with one side of the fabric and extending around said cord into overlapping relation with the opposite side of the fabric and being adhesively secured thereto by said tacky material, said oilcloth having its coated surface exposed, and the opposite side of said fabric layer having a substantial exposed area.

WILLIAM J. MacLEOD.